United States Patent
Bonarius et al.

(10) Patent No.: US 9,998,605 B2
(45) Date of Patent: Jun. 12, 2018

(54) AUDIO STREAM ARRANGEMENT

(71) Applicant: Robert Bosch GmbH, Stuttgart (DE)

(72) Inventors: Jochem Bonarius, Eindhoven (NL); Marc Smaak, Bergen op Zoom (NL)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 14/653,472

(22) PCT Filed: Dec. 27, 2012

(86) PCT No.: PCT/EP2012/076975
§ 371 (c)(1),
(2) Date: Jun. 18, 2015

(87) PCT Pub. No.: WO2014/101945
PCT Pub. Date: Jul. 3, 2014

(65) Prior Publication Data
US 2015/0334246 A1 Nov. 19, 2015

(51) Int. Cl.
*H04M 3/56* (2006.01)
*H04L 29/06* (2006.01)

(52) U.S. Cl.
CPC ........ *H04M 3/568* (2013.01); *H04L 65/4038* (2013.01); *H04M 3/561* (2013.01)

(58) Field of Classification Search
CPC .... H04M 3/568; H04M 3/562; H04M 1/2535; H04W 48/16; H04L 2012/5671; H04L 29/12
See application file for complete search history.

(56) References Cited

U.S. PATENT DOCUMENTS 7,016,339 B1   3/2006 Naudus et al.
7,079,495 B1   7/2006 Pearce et al.
(Continued)

FOREIGN PATENT DOCUMENTS

JP   2000332753 A   11/2000
JP   2004336160 A   11/2004
(Continued)

OTHER PUBLICATIONS

International Search Report for Application No. PCT/EP2012/076975 dated Jul. 18, 2013 (2 pages).

*Primary Examiner* — Ayaz Sheikh
*Assistant Examiner* — Debebe Asefa
(74) *Attorney, Agent, or Firm* — Michael Best & Friedrich LLP

(57) ABSTRACT

Conference systems are often installed in plenary halls and comprise a plurality of microphones for participants of a discussion, whereby the speech signals of the participants are received by the microphones, amplified by the conference system and distributed to the other participants of the discussion. An audio stream arrangement (1) is proposed comprising: a plurality of audio devices (2), whereby each audio device (2) is adapted to provide an audio stream and whereby each audio device (2) comprises an audio device network interface (8) for transmitting its audio stream over a network (5), a control device (4), whereby the control device (4) is adapted to send a command over the network (5) to any of the audio devices (2) to set the audio device (2) in an active state, whereby the audio device (2) in the active state transmits its audio stream over the network (5), a processing device (3) for processing the audio streams from the active audio devices (2), whereby the processing device (3) comprises a processing device network interface (9) for receiving the audio streams from the network (5) and a mixing unit (11) with a plurality of input channels (12) and (Continued)

an output channel (13), whereby each input channel (12) can be assigned to a audio stream from one active audio device (2) and whereby the mixing unit (11) is operable to mix the audio streams from the plurality of input channels (12) into a common audio stream and to output the common audio stream to the output channel (13), whereby the audio streams from the active audio devices (2) to the processing device are transmitted by a multicast transmission.

10 Claims, 1 Drawing Sheet

(56) References Cited

U.S. PATENT DOCUMENTS

| | | | |
|---|---|---|---|
| 8,965,544 B2* | 2/2015 | Ramsay | H04R 27/00 |
| | | | 700/94 |
| 2003/0002448 A1* | 1/2003 | Laursen | H04L 65/4038 |
| | | | 370/261 |
| 2007/0105579 A1 | 5/2007 | Shaffer et al. | |
| 2007/0211703 A1 | 9/2007 | Gu et al. | |
| 2009/0011801 A1 | 1/2009 | Van Der Schaar et al. | |
| 2010/0125353 A1 | 5/2010 | Petit-Huguenin | |
| 2013/0010647 A1* | 1/2013 | Fukata | H04L 12/42 |
| | | | 370/255 |

FOREIGN PATENT DOCUMENTS

| | | |
|---|---|---|
| JP | 2005045773 A | 2/2005 |
| JP | 2005269347 A | 9/2005 |
| WO | 2011009483 A1 | 1/2011 |

\* cited by examiner

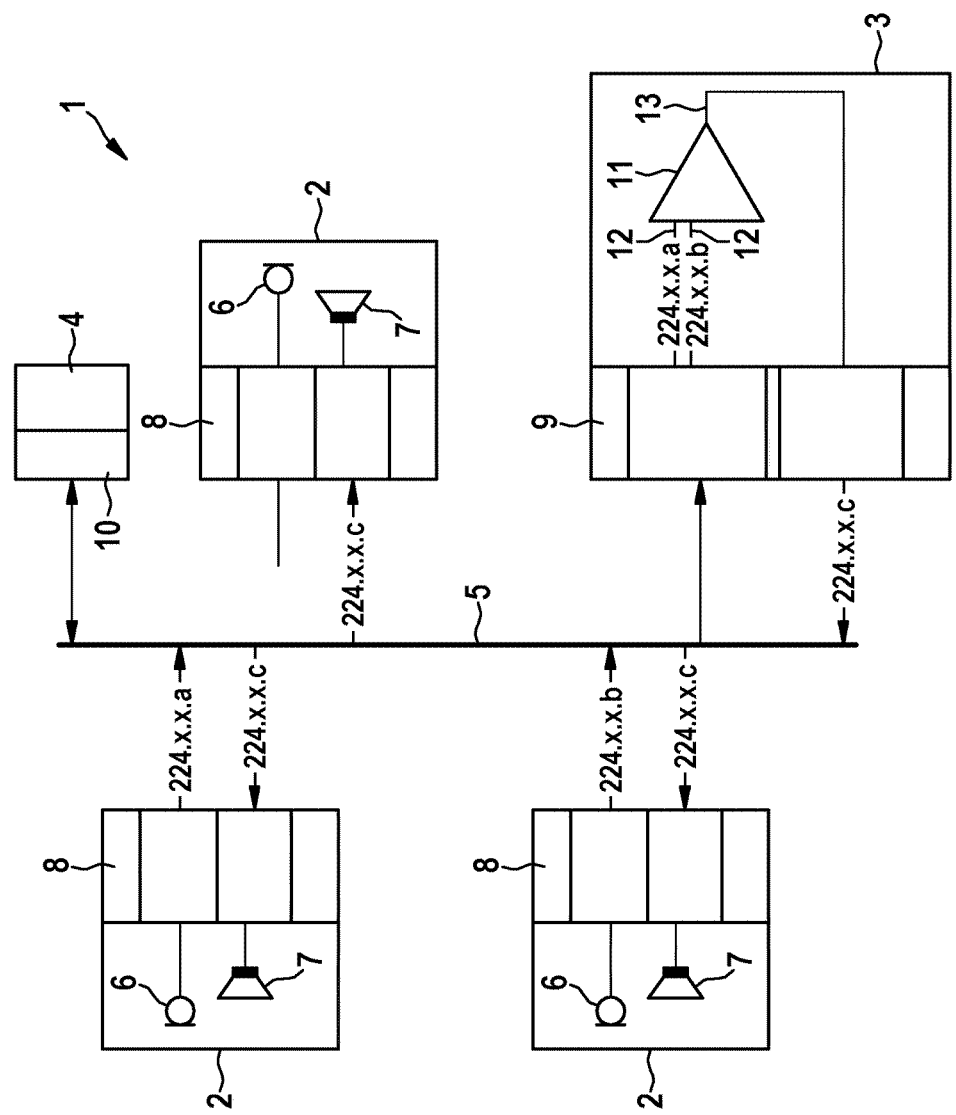

AUDIO STREAM ARRANGEMENT

BACKGROUND OF THE INVENTION

The invention relates to an audio stream arrangement. More specifically the invention relates to an audio stream arrangement comprising a plurality of audio devices, whereby each audio device is adapted to provide an audio stream and whereby each audio device comprises an audio device network interface for transmitting its audio stream over a network, a control device, whereby the control device is adapted to send a command over the network to any of the audio devices to set the audio device in an active state, whereby the audio device in the active state transmits its audio stream over the network, a processing device for processing the audio streams from the active audio devices, whereby the processing device comprises a processing device network interface for receiving the audio streams from the network and a mixing unit with a plurality of input channels and an output channel, whereby each input channel can be assigned to an audio stream from one active audio device and whereby the mixing unit is operable to mix the audio streams from the plurality of input channels into a common audio stream and to output the common audio stream to the output channel.

Conference systems are often installed in plenary halls and comprise a plurality of microphones for participants of a discussion, whereby the speech signals of the participants are received by the microphones, amplified by the conference system and distributed to the other participants of the discussion. The document DE 10 2006 014680 A1 discloses a communication system with a plurality of communication edge devices and a central device, whereby each of the communication edge devices comprises a microphone. The communication edge devices and the central device are connected by a network, for example a LAN (local area network).

SUMMARY OF THE INVENTION

The audio stream arrangement according to the invention is preferably a network system with a plurality of network components. The network connecting the network components is preferably an IP network using the internet protocol. Preferably the network uses the internet protocol version 4 (IPv4) or the internet protocol version 6 (IPv6). In a possible embodiment, the network is part of the audio stream arrangement.

The audio stream arrangement comprises a plurality audio devices, for example more than ten, twenty or thirty audio devices, as network components, whereby each audio device is adapted to provide an audio stream. The audio stream may be realized as a compressed data using an audio codec such as mp3, Vorbis or AAC. The audio stream is especially a digital audio stream. Each audio device comprises an audio device network interface for transmitting its audio stream over the network.

The audio stream arrangement further comprises a control device as a further network component, whereby the control device is adapted to send a command over the network to any of the audio devices to set the audio device preferably from a passive state in an active state. The audio device being in the active state transmits its audio stream over the network.

As a further network component the audio stream arrangement comprises a processing device for processing the audio streams from the active audio devices. In the audio stream arrangement none, one, some or a plurality of the audio devices may be set in the active state. The processing device comprises a processing device network interface for receiving the audio streams from the network. Further the processing device comprises a mixing unit with a plurality of input channels and an output channel. The input channels can be assigned to the audio streams from the active audio devices one by one (1:1). The mixing unit is operable to mix the audio streams from the plurality of input channels into a common audio stream and to output the common audio stream to the output channel. It is possible, that all input channels are assigned to audio streams from active audio devices. It is also possible, that only one or only two input channels are assigned to active audio devices, so that the common audio stream comprises only the audio signal from one or two active audio devices.

During operation of the audio stream arrangement the number of audio devices wanting to participate in the common audio stream may be higher than the number of the input channel, so that only a selection of the audio devices can be assigned to the input channels. Preferably the audio devices are in an active state in case they fulfill two conditions, which are, that the audio device transmits its audio stream over the network and that the audio stream of the audio device is assigned to one of the input channels of the mixing unit.

According to the invention the audio stream arrangement is adapted, especially operable to transmit the audio streams from the active audio devices to the processing device over the network by a multicast transmission. A multicast transmission is a 1 to n (1:n) transmission from a transmitter to a receiver and uses preferably a multicast protocol. The multicast transmission is preferably realized as IP multicast.

The underlying idea of multicast transmission is, that a single audio stream from a source can be sent to a group of recipients. In general and on the first glance a unicast transmission appears to be more adequate for the audio stream arrangement, because the audio streams from each active audio device is sent 1 to 1 (1:1) to the processing device.

But it was realized that for example changing from one present active audio device to another next active audio device for providing the processing device, especially one of the input channels, with the audio stream requires a plurality of commands from the control device, which have to be transmitted over the network. So in case of the unicast transmission and in case of the active audio device four communication messages or commands must be transmitted:

1. To the present active audio device: Stop transmitting to the processing unit via unicast
2. To the processing device: Stop receiving from the present active audio device
3. To the next active audio device: Start transmitting to the processing device
4. To the processing device: Start receiving from the next active audio device.

In a busy network this can take too long, which might result in a loss of the beginning of the audio signal from the next active audio device. Even if for example the first three messages or commands are executed fast, but the fourth message is delayed, the start of the audio signal is missing.

To the contrary by using multicast for transmitting the audio streams from the active audio devices to the processing device it is possible to set up and change the active audio devices about fifty percent faster than when using unicast transmission. This avoids the loss of the first part of the audio signal, especially without introducing an audio delay on the audio stream or the audio signal respectively.

Compared to the set of commands used by the unicast transmission, replacing the present active audio device with the next active audio device requires only two messages or commands, which are:

1. To the present active audio device: Stop
2. To the next active audio device: Start The invention exploits that the sender or transmitter from a multicast transmission can be replaced by another transmitter without informing the receiver of the multicast transmission. This difference between unicast and multicast transmission saves fifty percent of the messages or commands during a replacement of the active audio device assigned to one of the input channels.

It is especially preferred, that the active audio device is adapted to transmit its audio stream to a multicast address. The multicast address is preferably set per definition between 224.0.0.0 to 239.255.255.255 in the address room.

In a preferred embodiment of the invention the processing device network interface, especially the address of the processing device network interface, is in the group of a multicast transmission with a multicast address. For example a multicast protocol, such as the Internet Group Management Protocol (IGMP) is used to manage delivery of the multicast stream to the multicast address, whereby the processing device is the one and preferably only group member of recipients of that multicast address on the network of the multicast address.

In another possible embodiment of the invention the processing device network interface has the multicast address as its own address. In this embodiment all difficulties concerning the assignment of the processing device to a group from a multicast address are eliminated as the processing device is the owner and therefore receiver of the audio stream sent to the multicast address.

It is especially preferred, that the audio stream arrangement is adapted to reserve a number of multicast addresses during initialization of the audio stream arrangement, whereby the number of the multicast addresses reserved are equal to the number of the input channels of the mixing device and whereby the multicast addresses are assigned to the input channels of the mixing device 1:1. So each input channel gets its own multicast address.

Furthermore the processing device network interface is instructed to start receiving data, especially audio streams, from the network on the multicast addresses. So in case audio streams are sent to the multicast addresses, they will arrive at the input channels assigned to the multicast addresses. In case no audio streams are sent to one of the multicast addresses and thus to the input channel, the respective audio input channel will mute and will not form an audible part of the common audio stream. In fact it can be still a part of the common audio stream but since it is muted (only 0 samples) it does not have any influence on it.

During operation the control device is adapted or operable to set any of the audio devices into the active state by sending a start command together with the multicast address, which is assigned to one of the input channels of the mixing unit. As soon as the respective audio device receives the start command, it will start to transmit its audio stream to the multicast address of the start command. The start command is for example "audio device 1 start Tx 224.x.x.a".

In order to replace a present active audio device by a next active audio device the control device is adapted or operable to send a stop command to the present active audio device and the start command to the next active audio device with the multicast address of the present active audio device. It is preferred to first stop and then to start in order to avoid two sources on the same multicast address. Preferably a reliable communication like TCP is used for the commands It shall be underlined, that during the replacement of the assignment no commands are sent to the processing device from the control device. The processing device will continue feeding the audio stream received from the respective multicast address over the input channel into the mixing unit.

In a possible development of the invention the audio devices each comprises a loudspeaker or a headphone or a respective interface for connecting a loudspeaker or a headphone, whereby the processing device, especially the processing device network interface is adapted to distribute the common audio stream by a multicast transmission to all audio devices, especially regardless whether they are in the active or in the passive state. Alternatively or additionally the common audio stream is distributed to another loudspeaker having a loudspeaker network interface.

In a further development of the invention some or each of the audio devices comprise a microphone for receiving a speech signal from a speaker or a participant. The speech signal is converted by the microphone in an analog audio signal and then digitized into the audio stream.

It is especially preferred that the audio stream arrangement is a real-time system, so that a time difference or delay between the input of the speech signal to the output of the speech signal to the loudspeaker or the headphone based on the common audio stream is less than 0.1 s, especially less than 0.01 s (second).

In a preferred application of the invention, the audio stream arrangement is embodied as a conference system. In this embodiment the audio devices are realized as delegate units each comprising a microphone and optionally a loudspeaker. Such conference systems are used in plenary halls or meeting rooms in case a plurality of people wants to discuss with each other. The delegate units are for example table top devices having a base body and a microphone arranged on the base body and can be connected to the network by the audio device network interface. During operation a speaker or participant of the discussion sits or stands in front of the delegate unit and speaks into the microphone in order to input his speech signal to the conference system. The speech signal is then converted into the audio stream and sent to the processing device. As it is possible, that during operation more than one speaker or participant are speaking, two or more audio streams from active delegate units are sent to the processing device. These audio streams are mixed to the common audio stream and distributed to the loudspeakers of the delegate units or to the external loudspeakers as described above.

Preferably the delegate units can be activated by voice input, i. e. are voice activated. With this function a speaker just starts to speak into the microphone and the delegate unit will automatically try to get into the active state, so that the speech signal from the speaker is sent to the processing device. As the voice activation is a very fast process, the invention has the advantage that for changing the delegate unit from a passive state in the active state only very few commands must be transferred over the network to set the delegate unit in the active state. For changing from the passive in the active state, the delegate unit will request an input channel commit from the control device. The control device will grant the request and will send the start command with the multicast address of a free input channel of the processing device or the mixing unit, respectively, to the requesting delegate unit. As a reaction to the start command, the delegate unit will change from the passive in the active state. As only two commands must be transferred over the network, the voice activation can be realized very fast, so that also the beginning of the speech, especially the first word, can be send to the processing device and thus amplified and emitted by the conference system.

BRIEF DESCRIPTION OF THE DRAWINGS

Further advantages, features and effects of the invention will become apparent by the following description of a preferred embodiment of the invention. The FIGURE show:

FIG. 1 shows a schematic block diagram of a conference system as an embodiment of the invention.

DETAILED DESCRIPTION

FIG. 1 illustrates a conference system 1 as an example for an audio stream arrangement and for an embodiment of the invention. The conference system 1 comprises a plurality of delegate units 2 as audio devices, a processing device 3 and a control device 4, which are interconnected over an IP-network 5.

The conference system 1 is for example installed in a plenary hall, a meeting room or the like and allows that speech signals of speakers as participants of the discussions are amplified, so that other participants of the discussion can hear the speech signal of the speaker. In a regular installation each participant uses a delegate unit 2, which is for example realized as a table-top or build-in-unit.

The delegate unit 2 comprises a microphone 6 and optionally a loudspeaker 7. The microphone 6 receives the speech signal of the speaker, the loudspeaker 7 emits the amplified speech signals of the participants. As explained in detail later, the speech signal is send together with other speech signals from other delegate units 2 to the processing device 3, which is operable to mix the speech signals into a common speech signal—also called amplified speech signal—and send it to the delegate units 2 in order to be emitted by the loudspeaker 7. Furthermore it is possible, that the common speech signal is sent to a loudspeaker (not shown) not being a part of the delegate unit 2. From a practical point of view the conference system 1 works in real time, so that the time-delay between receiving the speech-signal with the microphone 6 and emitting the common speech-signal with the loudspeaker 7 is smaller than 0.01 seconds.

As the number of channels for receiving speech signals in the processing unit 3 is limited, the control device 4 is adapted to set the delegate units 2 in an active or passive state, whereby the delegate units 2 in an active state send the speech signal to the processing device 3 and whereby in a passive state the delegate units 2 are quiet. So the control device 4 controls which delegate unit 2 shall be in the active and which delegate unit 2 in a passive state. A further reason to limit the number of active delegate units 2 is that mixing audio streams from many microphones together increase the noise (for example 3 dB for any time the inputs are doubled) and decreases feedback margins.

In order to start transmitting the delegate units 2 may comprise a switch or a button or—as an alternative—are voice-activated. After pressing the button or after starting to speak the delegate unit 2 sends a request to the control device 4 to speak. The control device 4 grants the request and allows the delegate unit 2 to change from the passive state in the active state. Afterwards the speech signal received by the microphone 6 is transferred to the processing device 3.

The communication between the delegate unit 2, control device 4 and processing device 3 is based on the IP-protocol. Each delegate unit 2 comprises a delegate unit network interface 8, enabling the delegate unit 2 to send the speech-signal from the microphone 6 as an audio-stream over the network 5. Furthermore the delegate unit network interface 8 enables the delegation unit 2 to receive the common speech-signal as a common audio-stream from the network 5.

The processing device 3 comprises a processing device network interface 9 enabling the processing device 3 to receive the audio streams from the active delegate units 2 and to transmit the common audio stream, which is based on the common audio-signal, over the network 5. The control device 4 comprises a control device network interface 10 enabling the control device 4 to send and to receive commands to the delegate units 2 and optionally to the processing device 3.

In network technology a difference is made between unicast, multicast, broadcast and anycast transmission. The transmission of the common audio-stream from the processing device 3 to all delegate units 2 or other loudspeakers are based on a multicast transmission, because one transmitter, the processing device 3 sends the data to a plurality of receivers, the delegate units 2. In the example as shown, the processing device 3 uses the multicast address 224.x.x.c. The delegate units 2, especially the delegate unit network interface 8 of the delegate units 2, are members of a group of that multicast address, so that these delegate units 2 receive the common audio stream.

To the contrary the transmission from the audio-stream from the delegate unit 2 to the processing device 3 only requires an unicast transmission, as only one transmitter sends data to one receiver. But instead of using unicast transmission, the delegate unit 2, especially the delegate unit network interface 8, uses a multicast transmission to transmit the audio stream to the processing device 3.

The processing device 3 comprises a mixing unit 11 with a plurality of input channels 12 for receiving audio-streams and an output channel 13 for output the common out-stream. The mixing unit 11 is adapted to mix the audio-stream from the input channels 12 into the one output channel 13. Each input channel 12 is assigned to a multicast address. In the example as shown two input channels 12 are assigned, whereby the first input channel 12 is assigned to the multicast address 224.x.x.a and the other input channel 12 is assigned to the multicast address 224.x.x.b.

In case a speaker in front of a delegate unit 2 wants to speak, the speaker starts to speak and triggers the request by voice-activation or uses a button or the like for indicating that he wants to speak. The request to speak is send to the control device 4 and is granted, whereby a start command is send back to the delegate unit 2. The start command is for example "delegate unit 2 start Tx 224.x.x.a". This start command indicates, that the delegate unit 2 shall send its audio stream to the multicast address, as indicated in the start command. As one of the input channels 12 is assigned to that multicast address, the audio stream is guided into that input channel 12 and mixed into the common audio stream by the mixing unit 11. It shall be underlined, that only one start command to one receiver, e.g. the delegate unit 2, is required to start the transmission of the audio stream.

For replacing a present active delegate unit 2, which is assigned to one of the input channels 12, by a next active delegate unit 2, only two commands are necessary: The first command is a stop command to the present active delegate unit 2 and the second command is a start command with the multicast address to the next active delegate unit 2. So for replacing one active delegate unit 2 by another active delegate unit 2, only two commands are necessary.

The multicast addresses are assigned to the input channels 12 during initialization of the conference system 1, especially of the processing device 3. During the initialization the processing device network interface 9 is instructed to receive on the multicast addresses of the input channels 12. The receiving IP-audio-block of the processing device network interface 9 will mute the audio channel 12, when no data is received on or for an input channel 12.

As indicated above, the conference system 1 needs only very few commands to start transmitting audio stream from one of the delegate units 2 to the processing device 3 and only very few commands to replace an active delegate unit 2 with another active delegate unit 2. This has great advantages in view of the performance, especially the time needed to start processing the speech signal in the processing device 3. Compared to the use of unicast transmission, the number of commands is reduced by 50% for starting a transmission or changing the active delegate unit 2. This improvement in performance avoids the loss of the first part of a word, when somebody starts speaking without introducing an audio delay.

The invention claimed is:

1. An conference system audio stream arrangement (1) comprising:
   an internet-protocol (IP) network (5);
   a plurality of audio devices (2), each audio device (2) adapted to provide an audio stream and each audio device (2) comprising an audio device network interface (8) for transmitting its audio stream over the IP network (5);
   a control device (4), separate from the plurality of audio devices (2), coupled to the IP network (5) and adapted to send a command over the IP network (5) to any of the plurality of audio devices (2) to set an audio device (2) in an active state, whereby the audio device (2) only transmits its audio stream over the network (5) when the audio device (2) is in the active state;
   a processing device (3), separate from the plurality of audio devices (2), the processing device (3) processing the audio streams from the active audio device (2), the processing device (3) comprising a processing device network interface (9) which receives the audio streams from the IP network (5) and a mixing unit (11) with a plurality of input channels (12) and an output channel (13), each input channel (12) assigned to an audio stream from one of the plurality of audio devices (2), the mixing unit (11) operable to mix the audio streams from the plurality of input channels (12) into a common audio stream and to output the common audio stream to the output channel (13), the output channel (13) outputting the common audio stream on the IP network;
   wherein the audio streams from the active audio devices (2) to the processing device are transmitted by a multicast transmission; and
   wherein the plurality of audio devices (2) are delegate units of the conference system.

2. The audio stream arrangement (1) according to claim 1, wherein the active audio device (2) is configured to transmit its audio stream to a multicast address.

3. The audio stream arrangement (1) according to claim 2, wherein the processing device network interface (9) is configured to receive the audio stream on the multicast address.

4. The audio stream arrangement (1) according to claim 2, wherein the audio stream arrangement (1) is configured to reserve a number of multicast addresses during initialization of the audio stream arrangement (1), the number of the multicast addresses are equal to the number of the input channels (12) of the mixing device (11).

5. The audio stream arrangement (1) according to claim 2, wherein during initialization the processing device network interface (9) is instructed to start receiving data from the network (5) on or from the multicast addresses.

6. The audio stream arrangement (1) according to claim 1, wherein the control device (4) is configured to set any of the plurality of audio devices (2) into an active state by sending a start command together with the multicast address.

7. The audio stream arrangement (1) according to claim 6, wherein the control device is configured to replace an assignment of one active audio device to one of the input channels by another audio device by sending a stop command to the active audio device and the start command to the other audio device.

8. The audio stream arrangement (1) according to claim 1, wherein the audio device (2) comprises a loudspeaker (7) or a headphone, whereby the processing device (3) is adapted to distribute the common audio stream by a multicast transmission to all the audio devices (2), wherein the common audio stream is emitted by the loudspeaker (7) or the headphone.

9. The audio stream arrangement (1) according to claim 1, wherein the audio stream arrangement (1) is a real-time system, whereby the time difference or delay between transmitting the audio stream from one of the active audio devices (2) to the processing device (3) and receiving the common audio stream with the audio stream by the same audio device (2) is smaller than 0.1 seconds.

10. The audio stream arrangement (1) according to claim 5, wherein the data are audio streams from the network (5) on or from the multicast addresses.

* * * * *